United States Patent
Kwon

(10) Patent No.: US 8,837,897 B2
(45) Date of Patent: Sep. 16, 2014

(54) METHOD OF SUPPORTING SCENE-BASED SEEKING WHILE REPRODUCING CONTENT IN DISTRIBUTED MULTIMEDIA SYSTEM

(75) Inventor: Won-seok Kwon, Suwon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 721 days.

(21) Appl. No.: 12/318,747

(22) Filed: Jan. 7, 2009

(65) Prior Publication Data

US 2009/0180751 A1   Jul. 16, 2009

Related U.S. Application Data

(60) Provisional application No. 61/021,154, filed on Jan. 15, 2008.

(30) Foreign Application Priority Data

Aug. 20, 2008  (KR) ........................ 10-2008-0081366

(51) Int. Cl.
| | | |
|---|---|---|
| H04N 5/765 | (2006.01) | |
| H04N 7/16 | (2011.01) | |
| H04N 21/4728 | (2011.01) | |
| H04N 21/436 | (2011.01) | |
| H04N 21/84 | (2011.01) | |

(52) U.S. Cl.
CPC ........... *H04N 7/163* (2013.01); *H04N 21/4728* (2013.01); *H04N 21/436* (2013.01); *H04N 21/84* (2013.01)
USPC ............................ 386/200; 386/240; 386/241

(58) Field of Classification Search
USPC ......................................... 386/200, 240, 241
See application file for complete search history.

(56) References Cited

U.S. PATENT DOCUMENTS

| | | | |
|---|---|---|---|
| 7,082,577 B1 * | 7/2006 | Brosnahan .................... 715/860 |
| 8,065,335 B2 * | 11/2011 | Min et al. ...................... 707/793 |
| 2002/0056136 A1 | 5/2002 | Wistendahl et al. |
| 2005/0185924 A1 * | 8/2005 | Hagiwara et al. ............... 386/68 |
| 2006/0112192 A1 * | 5/2006 | Stewart et al. ................. 709/249 |
| 2006/0174290 A1 * | 8/2006 | Garwin et al. ................... 725/88 |
| 2007/0050837 A1 | 3/2007 | Lopez-Estrada |
| 2007/0094376 A1 | 4/2007 | Ahn et al. |

(Continued)

FOREIGN PATENT DOCUMENTS

| | | |
|---|---|---|
| CN | 1571386 | 1/2005 |
| CN | 1863078 | 11/2006 |

(Continued)

OTHER PUBLICATIONS

International Search Report mailed Aug. 27, 2009 and issued in corresponding International Patent Application PCT/KR2009/00230.

(Continued)

*Primary Examiner* — Thai Tran
*Assistant Examiner* — Jose Mesa
(74) *Attorney, Agent, or Firm* — Staas & Halsey LLP

(57) ABSTRACT

A method of reproducing a plurality of scenes can support scene-based seeking while reproducing content in a distributed multimedia system. The method includes: receiving, information about the plurality of scenes from a media server; transmitting, the information about the plurality of scenes to a media renderer and controlling the media renderer to display the plurality of scenes; and selecting, in the UPnP control point, one of the plurality of scenes.

12 Claims, 3 Drawing Sheets

(56) References Cited

U.S. PATENT DOCUMENTS

| | | | |
|---|---|---|---|
| 2007/0136815 A1* | 6/2007 | Kasahara et al. | 726/26 |
| 2007/0143815 A1 | 6/2007 | Choi | |
| 2007/0174478 A1 | 7/2007 | Ryu et al. | |
| 2009/0133089 A1* | 5/2009 | Ku et al. | 725/131 |

FOREIGN PATENT DOCUMENTS

| | | |
|---|---|---|
| CN | 101992054 A | 3/2011 |
| EP | 1793532 A2 | 6/2007 |
| KR | 10-2006-0094161 | 8/2006 |
| WO | 2007/066901 | 6/2007 |

OTHER PUBLICATIONS

Extended European Search Report dated Jan. 12, 2012 issued in corresponding European Patent Application No. 09702257.8.

Chinese Office Action mailed Dec. 31, 2012 in corresponding Chinese Patent Application No. 200980103220.4.

European Office Action dated Nov. 5, 2013 in European Patent Application No. 09702257.8.

Chinese Office Action dated Sep. 16, 2013 in Chinese Patent Application No. 200980103220.4.

Chinese Office Action mailed Apr. 4, 2014 in related Chinese Application No. 200980103220.4.

\* cited by examiner

METHOD OF SUPPORTING SCENE-BASED SEEKING WHILE REPRODUCING CONTENT IN DISTRIBUTED MULTIMEDIA SYSTEM

CROSS-REFERENCE TO RELATED APPLICATIONS

This application claims the benefit of U.S. Provisional Patent Application No. 61/021,154, filed on Jan. 15, 2008, in the USPTO, and Korean Patent Application No. 10-2008-0081366, filed on Aug. 20, 2008, in the Korean Intellectual Property Office, the disclosures of which are incorporated herein in their entirety by reference.

BACKGROUND

1. Field

One or more embodiments of the present invention relate to universal plug and play (UPnP), and more particularly, to a method of supporting scene-based seeking while reproducing content in a distributed multimedia system such as a UPnP audio/video (AV) multimedia system.

2. Description of the Related Art

Universal plug and play (UPnP) is a set of computer network protocols to allow individual devices or home appliances, such as a personal computer (PC) and a printer, to connect and communicate with one another in a home environment. In general, UPnP uses, but is not limited to, Internet protocols, such as a transfer control protocol/Internet protocol (TCP/IP) and a dynamic host configuration protocol (DHCP), in order to seamlessly connect networked devices having unique Internet protocol (IP) addresses, and an extensible markup language (XML) in order to describe the networked devices.

Plug and play (PnP) is a technology for attaching peripheral devices to a PC, whereas UPnP is derived from PnP and can be used even in a home network.

A scene refers to chapters in a digital versatile disk (DVD) system.

UPnP audio/video (AV) does not provide any mechanism that shows scenes of video content.

SUMMARY

One or more embodiments include a method of supporting scene-based seeking while reproducing content in a distributed multimedia system such as a universal plug and play (UPnP) audio/video (AV) multimedia system.

One or more embodiments include a computer-readable recording medium having embodied thereon a computer program for executing the method.

Additional aspects and/or advantages will be set forth in part in the description which follows and, in part, will be apparent from the description, or may be learned by practice of the invention.

To achieve the above and/or other aspects and advantages, one or more embodiments may include a method of reproducing a plurality of scenes, the method including: receiving, information about the plurality of scenes from a media server; transmitting, (in the UPnP control point), the information about the plurality of scenes to a media renderer and controlling the media renderer to display the plurality of scenes; and selecting, (in the UPnP control point), one of the plurality of scenes.

The transmitting of the information about the plurality of scenes to the media renderer and the controlling of the media renderer to display the plurality of scenes may include: transmitting a query for information about the number and positions of supported rendering surfaces to the media renderer and acquiring the information; binding, a rendering surface to a rendering instance with respect to each scene to be displayed; and transmitting, in the UPnP control point, the rendering instance corresponding to the scene to be displayed to the media render.

The selecting of the one of the plurality of scenes may include: receiving information about a scene to be selected by a user; and moving a focus of a current rendering surface so as to select a rendering surface corresponding to the scene to be selected by the user.

The information about the plurality of scenes may be scene metadata, wherein the transmitting of the information about the plurality of scenes to the media renderer and the controlling of the media renderer to display the plurality of scenes in the UPnP control point include: transmitting the scene metadata to the media renderer; and calling an action so as for the media renderer to display all selectable scenes.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
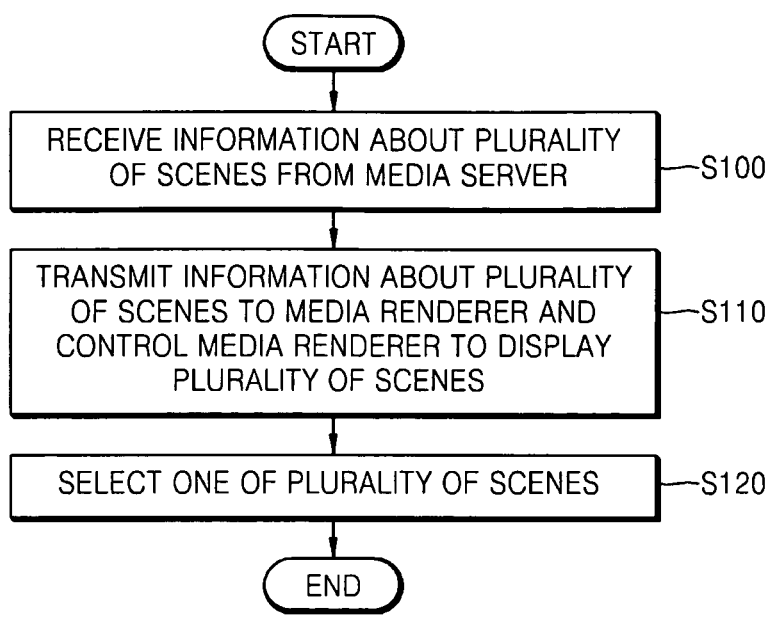
FIG. 1 is a flowchart illustrating a method of reproducing a plurality of scenes, according to an embodiment.

Reference will now be made in detail to embodiments, examples of which are illustrated in the accompanying drawings, wherein like reference numerals refer to the like elements throughout. In this regard, the present invention may be embodied in many different forms and should not be construed as being limited to the embodiments set forth herein. Accordingly, embodiments are merely described below, by referring to the figures, to explain aspects.

FIG. 1 is a flowchart illustrating a method of reproducing a plurality of scenes, according to an embodiment.

Referring to FIG. 1, in operation S100, a universal plug and play (UPnP) control point receives information about a plurality of scenes from a media server.

In operation S110, the UPnP control point transmits the received information about the plurality of scenes to a media renderer, and controls the media renderer to display the plurality of scenes.

In operation S120, the UPnP control point selects one of the plurality of scenes.

Figure 2:
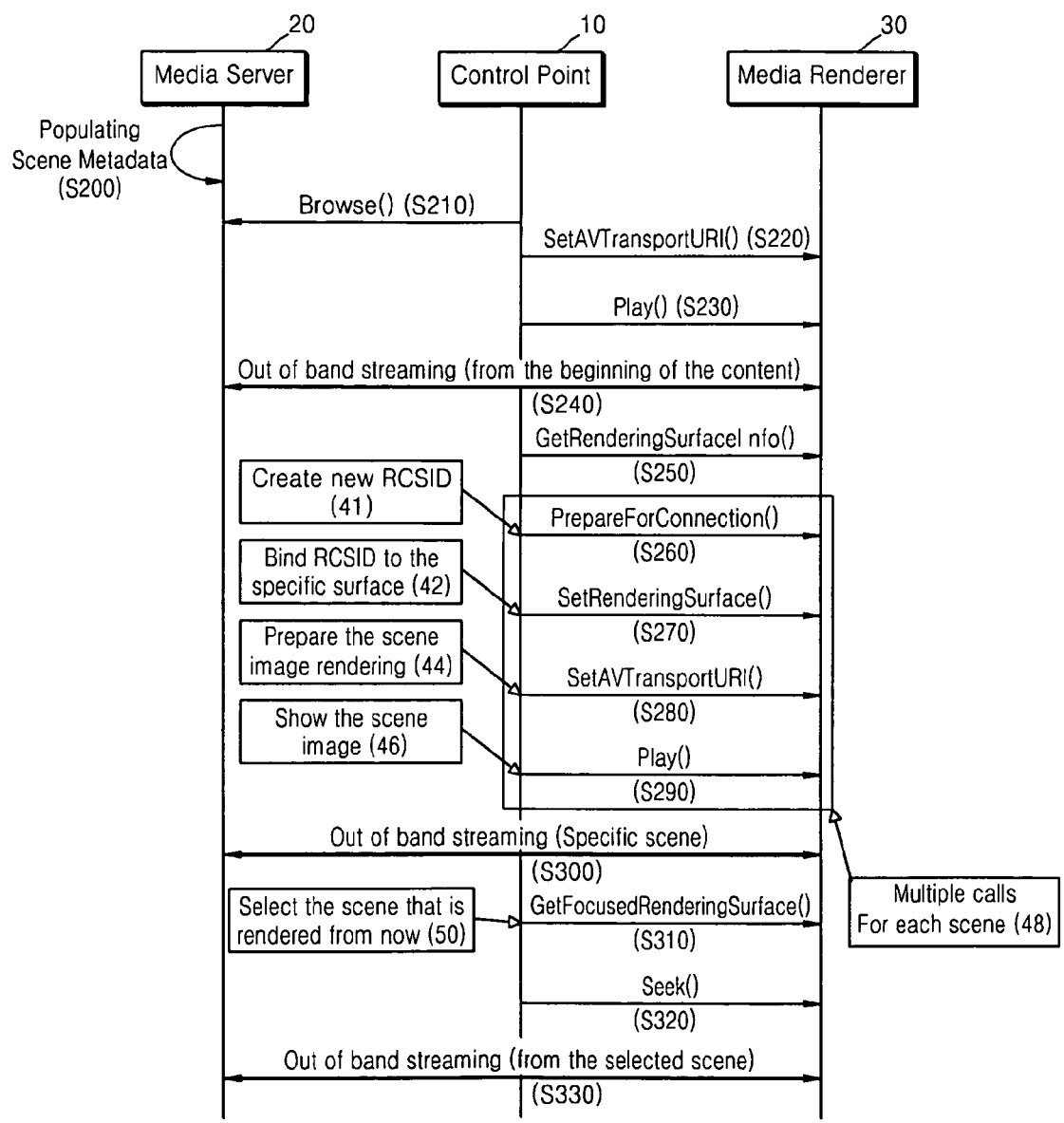
FIG. 2 is a flowchart illustrating a method of reproducing a plurality of scenes, according to another embodiment.

FIG. 2 is a flowchart illustrating a method of reproducing a plurality of scenes, according to another embodiment of the present invention.

In FIG. 2, a picture-in-picture UPnP application program interface (API) is used to provide a function of scene-based seeking.

In operation S210, a control point 10 calls a Browse( ) action to browse the native hierarchy of the content directory objects exposed by the content directory service of a media server 30.

In operation S220, the control point 10 calls a SetAVTransportURI( ) action to give a media renderer 30 the URI (Uniform Resource Identifier) information of a content resource.

In operation S230, the control point 10 calls a Play( ) action to play the content.

In operation S240, the content from the beginning is transferred from media server to media renderer by using out of band protocol such as RTP (Real-time Transport Protocol), HTTP (HyperText Transfer Protocol), etc.

In operation S250, the control point 10 calls a GetRenderingSurfaceInfo( ) action to determine the number and positions of rendering surfaces (another term for this is rendering windows) that can be supported.

In operation S260, the control point 10 calls a PrepareForConnection( ) action to bind a rendering surface to a rendering instance. The PrepareForConnection( ) action returns a rendering control service identification (RCSID) that is newly created(41) and is used to separate the rendering instance from others.

In operation S270, a user may select a rendering surface for displaying a scene image of the control point 10. At this time, the rendering surface is associated with the RCSID(42) that is created in operation S260. The rendering surface is now controlled by the RCSID.

In operations S280 and S290, the control point 10 calls a SetAVTransportURI( ) action to prepare the scene image rendering(44) and a Play( ) action to display the scene image (46).

In operation 48, the control point 10 repeats operations S260 through S280 depending on the number of scenes so that the media renderer 30 shows each of the scenes.

Now, the user can select a scene. In operation S300, a specific scene is transferred from the media server 20 to the media renderer 30 by using out of band protocol.

In operation S310, in order to select the scene(50), the control point 10 calls a GetFocusedRenderingSurface( ) action that returns information about the scene. Also, the GetFocusedRenderingSurface( ) action could receive an input argument to move a focus of the rendering surface to another surface, for example, UP, DOWN, RIGHT, or LEFT.

In operation S320, the control point 10 calls a Seek( ) action with the time position information of the selected scene.

In operation S330, content from the selected scene is transferred from the media server 20 to the media renderer 30 by using out of band protocol.

Figure 3:
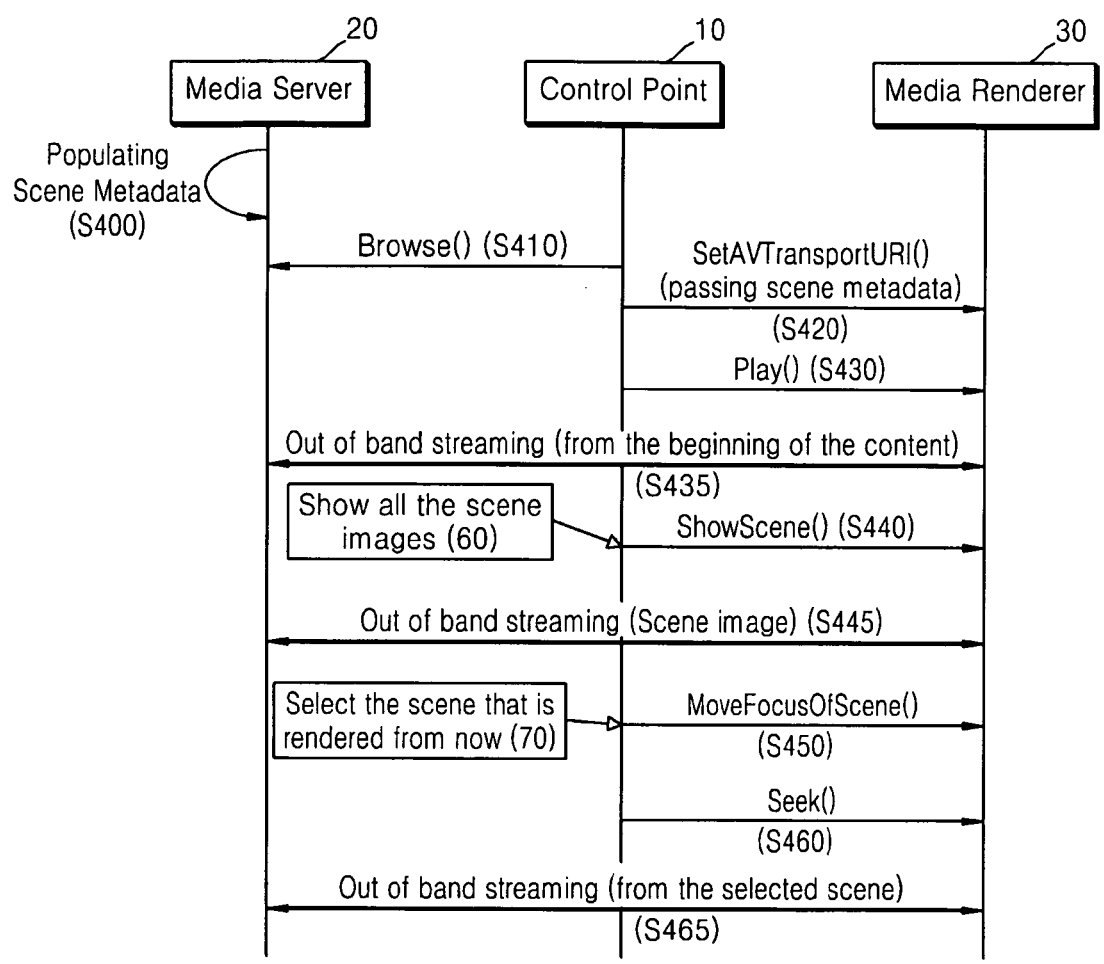
FIG. 3 is a flowchart illustrating a method of reproducing a plurality of scenes, according to another embodiment.

FIG. 3 is a flowchart illustrating a method of reproducing a plurality of scenes, according to another embodiment.

In FIG. 3, new UPnP APIs for scene-based seeking are illustrated.

In operation S410, the control point 10 calls a Browse( ) action to browse the native hierarchy of the content directory objects exposed by the content directory service of the media server 30.

In operation S420, the control point 10 calls a SetAVTransportURI( ) action and passes scene metadata as an input argument to the media renderer 30.

In operation S430, the control point 10 calls a Play( ) action to play the content.

In operation S435, streaming the content is started with out of band protocols such as HTTP(Hypertext Transfer Protocol) and etc.

In operation S440, while the user is watching video content, the control point 10 calls a ShowScene( ) action to see what scenes are selectable in the video content(60). At this time, the user can see a number of scenes on a displayer of the media renderer 30 with out of band protocols such as HTTP (Hypertext Transfer Protocol) and etc. In operation S445.

In operation S450, the control point 10 invokes a SetFocusOfScene( ) action to select the scene that is rendered from now(70) and acquire information about a scene. An input argument of the SetFocusOfScene( ) action may be a direction, for example, UP, DOWN, RIGHT, or LEFT, to move between the scenes. An output argument of the SetFocusOfScene( ) action could also be a uniform resource identifier (URI) of an image of the selected scene, by which the control point 10 can know the time position of the selected scene in a video stream.

In operation S460, the control point 10 calls a Seek( ) action along with information about the time position of the selected scene.

In operation S465, content from the selected scene is transferred from the media server 20 to the media renderer 30 by using out of band protocol.

The present invention may be embodied as computer-readable codes on a computer-readable recording medium. The computer-readable recording medium is any data storage device that can store data which can thereafter be read by a computer system. Examples of the computer-readable recording medium include read-only memories (ROMs), random-access memories (RAMs), CD-ROMs, magnetic tapes, floppy disks, and optical data storage devices.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of reproducing a plurality of scenes of video content, the method comprising:

receiving information, by an Universal Plug and Play (UPnP) control point, about the plurality of scenes from a media server;

transmitting the information, by the control point, about the plurality of scenes to a media renderer and controlling the media renderer, by the control point, to display the plurality of scenes;

selecting, by the control point, one of the plurality of scenes; and playing the video content starting from an initial time position of the scene which is selected by the control point, on the media renderer, wherein the transmitting of the information about the plurality of scenes to the media renderer and the controlling of the media renderer to display the plurality of scenes comprise:

transmitting a query for the number and positions of supported rendering surfaces to the media renderer and acquiring the information;

binding a rendering surface to a rendering instance with respect to each scene to be displayed; and transmitting the rendering instance corresponding to the scene to be displayed to the media render.

2. The method of claim 1, wherein the selecting of the one of the plurality of scenes comprises:

receiving information about a scene to be selected by a user; and moving a focus of a current rendering surface so as to select a rendering surface corresponding to the scene to be selected by the user.

3. The method of claim 1, wherein the information about the plurality of scenes is scene metadata, wherein the transmitting of the information about the plurality of scenes to the media renderer and the controlling of the media renderer to display the plurality of scenes comprise:

transmitting the scene metadata to the media renderer; and calling an action so as for the media renderer to display all selectable scenes.

4. A non-transitory computer-readable recording medium having embodied thereon a computer program for executing a method of reproducing a plurality of scenes of video content, wherein the method comprises:

receiving information, by an Universal Plug and Play (UPnP) control point, about the plurality of scenes from a media server;

transmitting the information, by the control point, about the plurality of scenes to a media renderer and controlling the media renderer, by the control point, to display the plurality of scenes;

selecting, by the control point, one of the plurality of scenes; and playing the video content starting from an initial time position of the scene which is selected by the control point, on the media renderer, wherein the transmitting of the information about the plurality of scenes to the media renderer and the controlling of the media renderer to display the plurality of scenes comprise:

transmitting a query for the number and positions of supported rendering surfaces to the media renderer and acquiring the information;

binding a rendering surface to a rendering instance with respect to each scene to be displayed; and transmitting the rendering instance corresponding to the scene to be displayed to the media render.

5. The non-transitory computer-readable recording medium of claim 4, wherein the selecting of the one of the plurality of scenes in the UPnP control point comprises:

receiving information about a scene to be selected by a user; and moving a focus of a current rendering surface so as to select a rendering surface corresponding to the scene to be selected by the user.

6. The non-transitory computer-readable recording medium of claim 4, wherein the information about the plurality of scenes is scene metadata, wherein the transmitting of the information about the plurality of scenes to the media renderer and the controlling of the media renderer to display the plurality of scenes in the UPnP control point comprise:

transmitting the scene metadata to the media renderer; and calling an action so as for the media renderer to display all selectable scenes.

7. The non-transitory computer-readable recordable medium of claim 4, wherein the receiving, transmitting, and selecting are performed in an Universal Plug and Play (UPnP) control point.

8. The method of claim 1, wherein the plurality of scenes from a media server.

9. The method of claim 1, wherein the scenes correspond to chapters.

10. A method of reproducing a plurality of scenes using a picture-in-picture Universal Plug and Play (UPnP) control point application program interface (API), the method comprising:

calling a Browse( ) action to browse the native hierarchy of content directory objects exposed by a content directory service of a media server;

calling a SetAVTransportURI( ) action to give a media renderer the Uniform Resource Identifier (URI) information of a content resource;

calling a Play( ) action to play the content;

transferring the content, from the beginning, from the media server to the media renderer;

calling a GetRenderingSurfaceInfo( ) action to determine the number and positions of rendering surfaces that can be supported;

calling, for each of the plurality of scenes, a PrepareForConnection( ) action to bind a rendering surface to a rendering instance by returning a rendering control service identification (RCSID) that is newly created and is used to separate the rendering instance from others;

selecting, by a user, a rendering surface to display a scene image of the control point;

calling, for each of the plurality of scenes, a SetRenderingSurface( ) action to associate the rendering surface with the returned RCSID;

calling, for each of the plurality of scenes, a SetAVTransportURI( ) action to prepare the scene image rendering and a Play( ) action to display the scene image;

selecting, by the user, a scene;

transferring the selected scene from the media server to the media renderer;

calling a GetFocusedRenderingSurface( ) action that returns information about the selected scene;

calling a Seek( ) action with the time position information of the selected scene; and transferring content from the selected scene from the media server to the media renderer.

11. A method of reproducing a plurality of scenes using a Universal Plug and Play (UPnP) control point, the method comprising:

determining the number and positions of rendering surfaces that can be supported;

binding, for each of the plurality of scenes, a rendering surface to a rendering instance by returning a rendering control service identification (RCSID) that is newly created and is used to separate the rendering instance from others;

selecting, by a user, a rendering surface to display a scene image of the control point;

associating, for each of the plurality of scenes, the rendering surface with the returned RCSID;

preparing, for each of the plurality of scenes, the scene image rendering and displaying the scene image;

selecting, by the user, a scene;

transferring the selected scene from the media server to the media renderer;

returning information about the selected scene;

locating content from the selected scene using the time position information of the selected scene; and transferring content from the selected scene from the media server to the media renderer.

12. The method of claim 1, wherein the initial time position of the selected scene is after a default playback start position of the video content.

* * * * *

UNITED STATES PATENT AND TRADEMARK OFFICE
CERTIFICATE OF CORRECTION

PATENT NO. : 8,837,897 B2  Page 1 of 1
APPLICATION NO. : 12/318747
DATED : September 16, 2014
INVENTOR(S) : Won-seok Kwon It is certified that error appears in the above-identified patent and that said Letters Patent is hereby corrected as shown below:

In the Claims

Column 5, Line 60, In Claim 7, Delete "recordable" and insert -- recording --, therefor.

Column 6, Line 27-28, In Claim 10, Delete "SetAVTransportURl( )" and insert
-- SetAVTransportURI( ) --, therefor.

Signed and Sealed this
Tenth Day of February, 2015

Michelle K. Lee
*Deputy Director of the United States Patent and Trademark Office*